(12) United States Patent
Cheng et al.

(10) Patent No.: US 8,671,331 B2
(45) Date of Patent: Mar. 11, 2014

(54) APPARATUS AND METHOD FOR COMMUNICATING FEC MODE AND ALARMING MISMATCH

(75) Inventors: Weiying Cheng, Naperville, IL (US); Jeffrey E. Budill, Aurora, IL (US)

(73) Assignee: Tellabs Operations, Inc., Naperville, IL (US)

( * ) Notice: Subject to any disclaimer, the term of this patent is extended or adjusted under 35 U.S.C. 154(b) by 1732 days.

(21) Appl. No.: 11/531,513

(22) Filed: Sep. 13, 2006

(65) Prior Publication Data

US 2008/0065960 A1 Mar. 13, 2008

Related U.S. Application Data

(60) Provisional application No. 60/823,524, filed on Aug. 25, 2006.

(51) Int. Cl.
*H03M 13/00* (2006.01)

(52) U.S. Cl.
USPC .......................................... 714/774; 714/776

(58) Field of Classification Search
USPC ................................. 714/774, 776
See application file for complete search history.

(56) References Cited

U.S. PATENT DOCUMENTS

| | | | | |
|---|---|---|---|---|
| 3,078,443 | A * | 2/1963 | Rose | 714/774 |
| 5,579,303 | A * | 11/1996 | Kiriyama | 370/252 |
| 5,699,365 | A * | 12/1997 | Klayman et al. | 714/708 |
| 5,699,369 | A * | 12/1997 | Guha | 714/774 |
| 5,757,367 | A | 5/1998 | Kapoor | |
| 5,856,988 | A * | 1/1999 | Kiriyama | 714/774 |
| 6,112,325 | A * | 8/2000 | Burshtein | 714/774 |
| 6,128,763 | A * | 10/2000 | LoGalbo et al. | 714/774 |
| 6,263,466 | B1 * | 7/2001 | Hinedi et al. | 714/755 |
| 6,285,681 | B1 * | 9/2001 | Kolze et al. | 370/442 |
| 6,477,669 | B1 * | 11/2002 | Agarwal et al. | 714/708 |
| 6,480,475 | B1 * | 11/2002 | Modlin et al. | 370/294 |
| 6,625,777 | B1 * | 9/2003 | Levin et al. | 714/774 |
| 6,665,831 | B1 * | 12/2003 | Yoshida et al. | 714/774 |
| 6,735,735 | B1 * | 5/2004 | Ohira et al. | 714/776 |
| 6,912,683 | B2 * | 6/2005 | Rifaat et al. | 714/774 |
| 6,931,009 | B1 * | 8/2005 | Agarwal | 370/395.1 |
| 6,993,700 | B1 * | 1/2006 | Player et al. | 714/758 |
| 6,996,123 | B1 * | 2/2006 | Jiang et al. | 370/465 |
| 7,010,180 | B2 * | 3/2006 | van Wijngaarden et al. | 385/11 |
| 7,028,241 | B1 * | 4/2006 | Blair et al. | 714/752 |
| 7,165,207 | B2 * | 1/2007 | Olivieri et al. | 714/774 |
| 7,283,752 | B2 * | 10/2007 | Liu | 398/152 |

(Continued)

FOREIGN PATENT DOCUMENTS

| | | |
|---|---|---|
| EP | 1 179 906 A2 | 2/2002 |
| EP | 1179906 A | 2/2002 |

OTHER PUBLICATIONS

Extended European Search Report for EP 07 10 8217, dated Nov. 7, 2007 (8 pages).

(Continued)

*Primary Examiner* — Joseph D Torres
(74) *Attorney, Agent, or Firm* — Husch Blackwell LLP

(57) ABSTRACT

A multi-mode transmission unit processes data to form an error correction code in accordance with one of a plurality of selectable processes. The data, correction code and a process identifier can be transmitted to a receiving unit which can carry out error correction of the data in accordance with the identified process.

21 Claims, 2 Drawing Sheets

(56) References Cited

U.S. PATENT DOCUMENTS

| | | | | |
|---|---|---|---|---|
| 7,451,381 | B2* | 11/2008 | Miller et al. | 714/774 |
| 7,555,700 | B2* | 6/2009 | Takagi | 714/774 |
| 7,822,343 | B2* | 10/2010 | Song et al. | 398/58 |
| 7,944,941 | B1* | 5/2011 | Bottorff et al. | 370/466 |
| 2002/0009100 | A1* | 1/2002 | Raghavan et al. | 370/474 |
| 2003/0072323 | A1* | 4/2003 | Frecassetti et al. | 370/445 |
| 2004/0268209 | A1* | 12/2004 | Srivastava et al. | 714/782 |
| 2005/0068995 | A1 | 3/2005 | Lahav et al. | |
| 2005/0276613 | A1 | 12/2005 | Welch et al. | |

OTHER PUBLICATIONS

Global Information, Inc.: Table of Contents for Report: "Dense Wavelength Division Multiplexing (DWDM) Market Opportunities, Strategies. and Forecasts, 2006 to 2012," WinterGreen Research, Inc.; Mar. 2003; Available at http://www.gii.w.jp/english/wg37236-dwdm_toc.html on Aug. 1, 2006, 6 pages.

Lavallee, B et al.: "Active Networks: As Passive Components Become Active, Network Designers Face Integrailon Challenges," OE Magazine, Jul. 2003, Available at http://oemagazine.com/FromtheMagzine/jul03/tutorial.html on Aug. 1, 2006: 9 pages.

Tellabs Press Release: "Tellabs Enhances the Tellabs® 7100 Optical Transport System to Enable Cost-Effective Wavelength Service Delivery at the Network Edge," Mar. 25, 2003; Available at http://www.tellabs.com/news/2003/nr032503b.shtml on Oct. 13, 2006; 2 pages.

"DWDM Prerequisite Training Tutorial, Release 1.0;" Fujitsu Network Communications, Inc.; Nov. 15, 2002; 46 pages.

"VDSL Tutorial: Fiber-Copper Access to the Information Highway;" DSL Forum (2001) Available online at http://www.dslforum.org/aboutdsl/vdsl_tutorial.html on Aug. 1, 2006; 6 pages.

"Cinta Networks—next stop, WAVEJunction;" Optical Keyhole: Interview with John Vaughan (Aug. 20, 2001); Available at http://www.opticalkeyhole.com on Aug. 1, 2006; 7 pages.

"Optical Transport Products for Your Broadband Networks;" Solutelia, LLC (2003); Available at http://www.solutelia.com on Aug. 1, 2006; 5 pages.

Williams, D.: "Turbo-Charging Next-Gen Wireless, Optical Systems;" CommsDesign (Feb. 1, 2001); 5 pages with accompanying figs. 1-6.

Cavendish, D.: "Topics in Lightwave—Evolution of Optical Transport Technologies: From SONET/SDH to WDM;" IEEE Communications (Jun. 2000); 12 pages.

"Converge Network Digest:" vol. 6, No. 227, (Nov. 24, 1999); Available at http://www.convergedigest.com/Daily/v6/v6n227.htm on Aug. 1, 2006; 4 pages.

"The Tellabs® 7100 Optical Transport System:" Lightriver Technologies, Inc.; 2 pages.

"DWDM Market Opportunities, Strategies, and Forecasts, 2003 to 2008;" Wintergreen Research, Inc. (2003): 18 pages.

Fleming, C.: "A Tutorial on Conventional Doding with Viterbi Decoding:" Spectrum Application, (1999); 6 pages.

Reinhardt, A.: "Building the Data Highway;" BYTE.com (Mar. 1994); 28 pages.

Barlow, G.: "A G.709 Optical Transport Network Tutorial:" (prior to Aug. 25, 2005); 9 pages.

Hossain, M.: Powerpoint presentation: "An Overview of ITU-T G.709:" York University (2002-2003); Available at http://www.cse.yorku.ca/course_archive/2002-03/F/6590A, 14 pages.

Gendron, R., et al.: "The G.709 Optical Transport Network—An Overview;" EXFO; Available at http://www.exfo.com/en/support/WaveReview/2006_July-August/WRArticle1.asp; 8 pages.

European Patent Office Search Report for corresponding European application 07108217.6-1237, Oct. 31, 2007.

* cited by examiner

APPARATUS AND METHOD FOR COMMUNICATING FEC MODE AND ALARMING MISMATCH

CROSS REFERENCE TO RELATED APPLICATION

This application claims the benefit of the filing date of U.S. Provisional Application Ser. No. 60/823,524 filed Aug. 25, 2006 and entitled "Apparatus and Method for Communicating FEC Mode and Alarming Mismatch" and which is incorporated herein by reference.

FIELD OF THE INVENTION

This invention pertains to optical communication systems. More particularly, the invention pertains to optical transport networks which can incorporate various types of forward error correction.

BACKGROUND OF THE INVENTION

Total traffic volume on optical networks which are in service has over a period of time increased. Additionally, the percent of data traffic versus voice traffic on such networks is continually increasing.

Responsive to ongoing needs for servicing the increasing both data and voice traffic an expanded network architecture has been defined in ITU standard G.872 entitled "Architecture of Optical Transport Networks (OTN)". ITU standard G.709 entitled "Interfaces for Optical Transport Networks" defines an implementation of an optical channel by means of digital framed signals. G.709 provides for the use of forward error correction which is intended to reduce transmission errors on noisy links. This capability in turn facilitates the deployment of longer optical spans. Both ITU G.872 and G.709 are incorporated herein by reference.

The G.709 standard provides for forward error correction using Reed-Salomon RS code. Using such codes, multiple transmission errors can be corrected at the receiving end. G.709 supports only a single FEC mode.

The ongoing development of products which implement the G.709 standard has resulted in a situation where a variety of forward error correction modes need to be supported. These include:

1. Standard FEC mode as defined in ITU G.709;
2. Enhanced vendor-developed FEC modes; and
3. No FEC mode.

There thus is an ongoing need to be able to communicate the FEC mode being used between the respective transmitter/receiver. Preferably, such communication could be implemented without imposing additional overhead on the transmissions while at the same time providing flexibility such that different FEC operational modes can be readily supported between transmitter and receiver, new as yet undefined modes can be incorporated as subsequently developed and multimode transmitters and receivers can be readily combined with singular mode receivers and transmitters.

SUMMARY OF THE INVENTION

A method in accordance with the invention establishes a payload data sequence. An error correction code sequence is established. An error correction mode defining sequence is established. The sequences are transmitted to a receiving location so that the receiving location can apply the same error correction code or alerting an operator with an error correction mode mismatch alarm.

DETAILED DESCRIPTION

Figure 1:
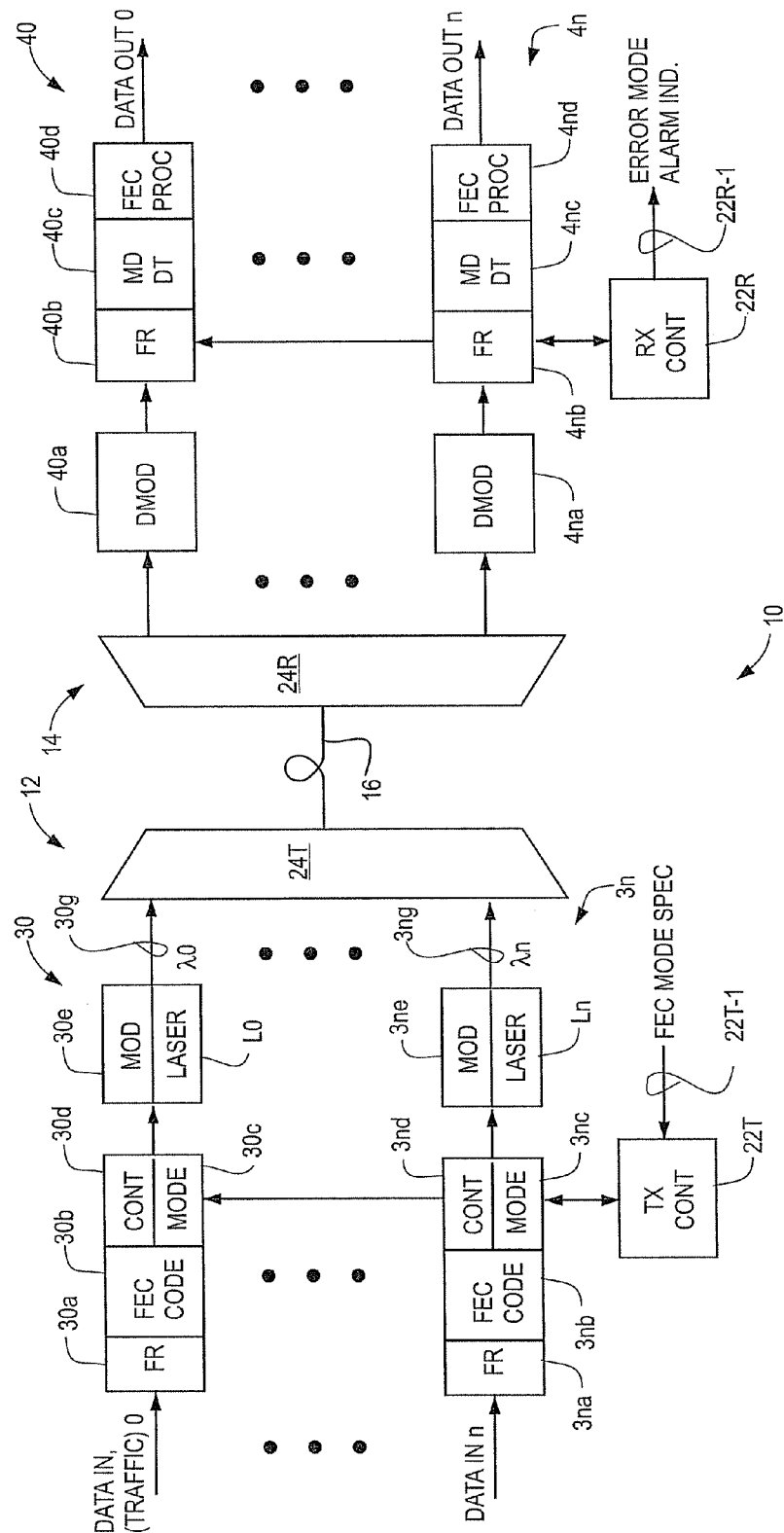
FIG. 1 is a block diagram of a system in accordance with the invention.

While this invention is susceptible of embodiment in many different forms, there are shown in the drawing and will be described herein in detail specific embodiments thereof with the understanding that the present disclosure is to be considered as an exemplification of the principles of the invention and is not intended to limit the invention to the specific embodiments illustrated.

Systems and methods which embody the invention, in a disclosed embodiment, utilize a reserved optical transport unit (OTU) overhead byte to encode the FEC mode. In one aspect of the invention, multi-FEC mode transmitters can be combined with receivers which only support the FEC processing defined in the standard G.709. Alternately, multimode receivers and transmitters can be coupled together via an optical channel with the receiver being able to associate another error correction code with corrected received payload data to determine the transmitted FEC mode so as to appropriately process the received payload.

An optical communication system which embodies the present invention incorporates at least one FEC encoder which, on a frame by frame basis, combines the coded FEC information with the payload such that the receiver can identify and correct transmission errors. In a disclosed embodiment, the payload portion of the frame as well as the FEC coded portion of the frame are defined in the G.709 standard and would be known to those of skill in the art. No further explanation of them is required.

Further, in accordance with the invention, available reserved overhead bits of a transmitted frame can be used to specify the FEC mode. Those bits can be evaluated by the receiver which can then appropriately process the received payload. The receiver can either update its FEC mode to match the transmitter FEC mode or raise an alarm to alert an operator to manually adjust the FEC mode on either side.

FIG. 1 illustrates a system 10 which embodies the present invention. It will be understood that the system 10 is exemplary only and, other than as explained below, the details of system 10 are not limitations of the present invention. System 10 incorporates a transmitter unit 12 and a unit 14. Transmitter unit 12 and receiver unit on 14 are coupled by optical link 16.

Transmission unit 12 transmits a plurality of traffic channels on fiber 16 to receiver unit 14. It will be understood that the specific characteristics of the link 16 are not limitations of the present invention.

Transmitter 12 incorporates a plurality of sources of monochromatic radiant energy, for example lasers L0 ... Ln. The lasers as would be understood by those of skill in the art each emit monochromatic radiant energy at a specific wavelength such as $\lambda_0, \lambda_1, \lambda_2, -\lambda_n$. For example, the various wavelengths could correspond to those incorporated into multi-channel wavelength division multiplexed (WDM or DWDM) optical communication systems without limitation.

Transmission unit 12 can in one mode of operation, in accordance with the invention, transmit optical payloads on a frame by frame basis to the receiving unit 14. Other transmission protocols also come within the spirit and scope of the present invention.

Transmitter unit 12 can include a control processor and FEC mode specifying circuitry 22T. FEC modes can be specified by a signal 22T-1.

Transmitter 12 includes data processing circuitry 30 ... 3n, which could include one or more programmed processors and associated software, which receive data streams, such as traffic information, DATA0 ... DATAn which are to be transmitted on the respective channel.

The circuits 30 ... 3n can be substantially identical. Only circuits 30 need be discussed in detail. The processing circuitry 30 includes framing circuitry 30a, FEC encoding 30b as well as FEC mode specifying circuitry 30c, and local control circuits 30d. Each of the circuits 30-3n can be configured to communicate with and operate under the control of processor 22T.

Processed data is coupled to a modulator 30e which in turn controls the output of the respective laser such as laser L0. A modulate data stream such as optical data stream 30g is then coupled to combiner or multiplexer 24T. Outputs from multiplexer or combiner 24T are coupled to the optical fiber 16 and transmitted to a de-multiplexer 24R.

As those of skill in the art will understand a plurality of modulated channels $\lambda_0 ... \lambda_n$ can be simultaneously transmitted on the fiber 16. The frames of data transmitted on each of the channels can include the FEC mode specification indicia or other information for use by elements of the receiver 14.

Receiver 14 incorporates a plurality of receiving elements such as elements 40 ... 4n which could be substantially identical. Only element 40 needs to be discussed.

Element 40 incorporates demodulation circuitry 40a, overhead and framing circuitry 40b, FEC mode detection circuitry 40c, and FEC processing circuitry 40d. Output from the FEC processing circuits 40d, a corrected traffic data stream DATA ONTO, can then be retransmitted or processed as desired. Processing circuitry 40d can respond to the type of received FEC coding, detected by circuitry 40c, where receiver unit 14 can process various FEC modes.

Elements 40-4n can communicate with and operate under the control of Rx Processor 22R. An alarm output 22R-1 can indicate a disparity between an FEC mode supportable by receiver 14 and one or more frames of received data with unsupported FEC coding. System 10 might include additional processing and/or transmitting elements, as would be understood by those of skill in the art, without departing from the spirit and scope of the invention.

Figure 2:
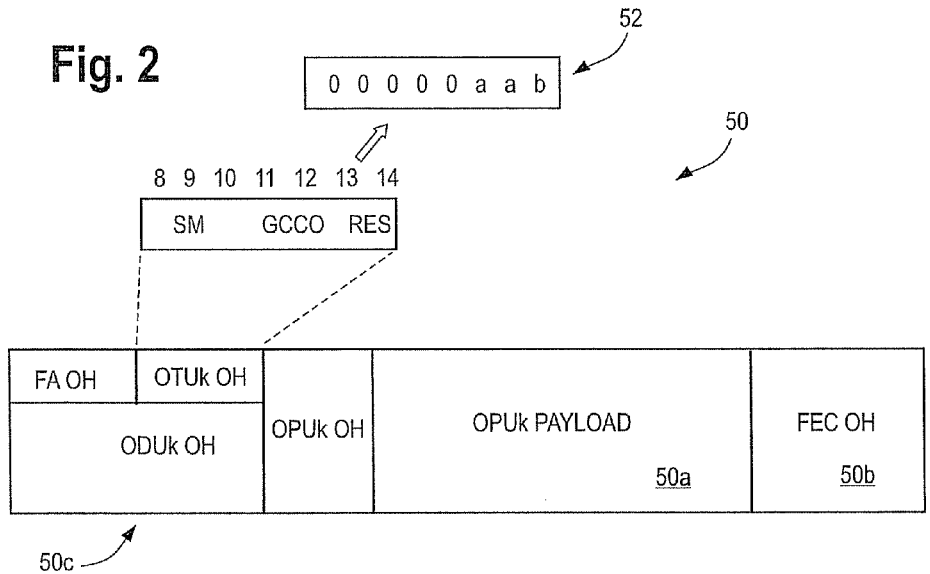
FIG. 2 illustrates characteristics of optical transmission network frames in accordance with the invention.

FIG. 2 illustrates an exemplary frame 50 of a type which could be transmitted, on a per wavelength basis, by the modulated lasers L0 ... Ln. The frame based outputs from circuitry 3i for example, coupled to the multiplexer 24T, as illustrated in FIG. 2, include a payload section 50a, an FEC overhead section 50b and a general supervisory overhead section 50c. Such frames and associated abbreviations are defined in standard G.709 and would be understood by those of skill in the art.

In accordance with FEC mode specifying information, such as an error correction mode indicator, received from controller 22T, each of the mode definition circuits 30c ... 3nc imparts into a portion of the overhead 50c an identifier of the respective FEC mode to be associated with the respective transmitted frame 50. FEC mode choices can include the standard FEC Reed-Solomon coding, no FEC coding or other types of coding as defined by the controller 22T and the mode defining circuitry 30c ... 3nc. That mode specifying information is incorporated into reserved overhead bits which form column 13 of reserved overhead byte RES illustrated generally at 52. For example and without limitation the following coding combinations of bits a,a could be used:

00: Standard FEC mode encoding;
01: Enhanced FEC mode encoding;
10: No FEC mode encoding.

The leading five bits could remain set to "0". The trailing bit could be implemented as a parity bit. Other code combinations and locations for the mode specifying indicator come within the spirit and scope of the invention.

The above designation of FEC mode provides flexibility such that a multi-mode transmitting unit 12 could be used with a compatible multi-mode receiving unit 14. On the other hand, if the receiving unit 14 operated only in the standard FEC mode as set forth by G.709 the transmitting unit 12 could then, under control of the controller 22T also operate in the standard FEC mode. In the event that the receiving unit 14 did not support forward error correction, the transmitting unit 12 could operate in the "No FEC mode".

Figure 3:
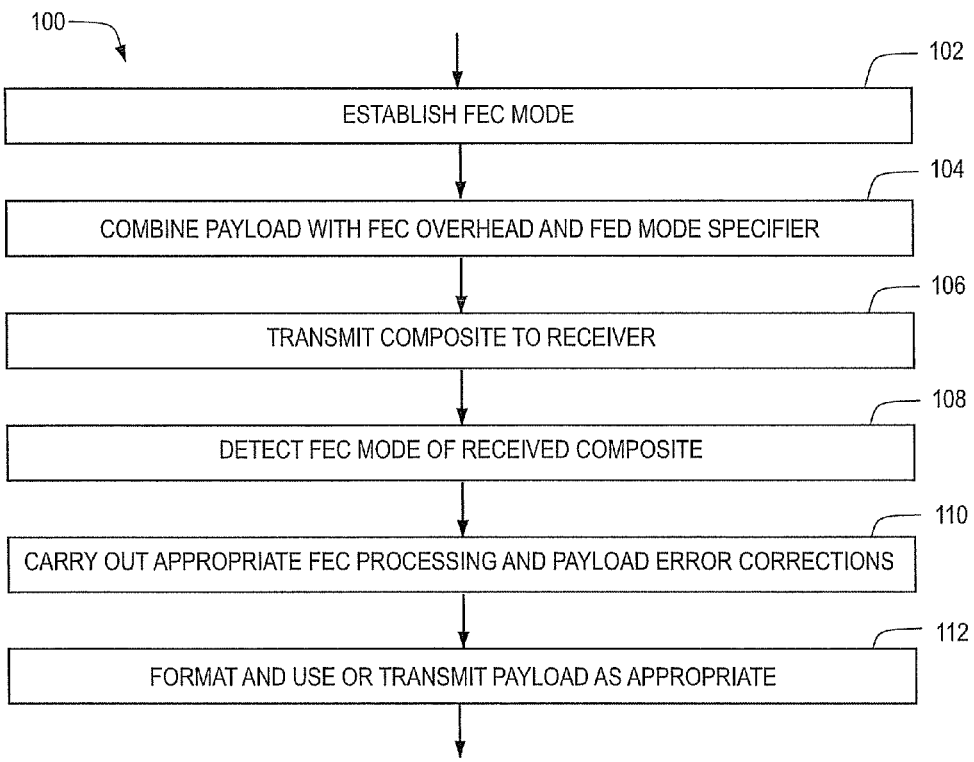
FIG. 3 illustrates a process which embodies the present invention.

FIG. 3 illustrates an exemplary process 100 in accordance with the invention. An FEC mode is established, step 102. A payload can be combined with FEC mode specifying information and coded FEC error correction data, step 104. The payload, FEC mode specification data as well as FEC error correction data and other relevant overhead can be transmitted, for example as a frame, to a receiver, step 106.

The mode specification data can be detected at the receiver, step 108. In accordance with the specified FEC mode, FEC error correction processing can be carried out relative to the payload, step 110. The corrected and processed payload can be formatted and transmitted to another destination, step 112.

The above description it will be understood is exemplary only. The type of FEC which is chosen is not a limitation of the present invention. For example, instead of using Reed-Solomon-type codes, a Bose-Chaudhuri-Hocquenghem type code could be used as an alternate. Other FEC type encoding comes within the spirit and scope of the present invention.

It will also be understood that the details of the transmitting unit as well as the receiving unit are not limitations of the present invention. For example, neither the number of channels, nor the types of modulation, nor the types of lasers are limitations of the present invention.

It will also be understood that the present invention is not limited to optical transport networks as defined in the ITU G.872 and G.709 standards. Other types of optical, or non-optical, transmission networks which incorporate multi-mode forward error correction come within the spirit and scope of the present invention.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

The invention claimed is:

1. An apparatus comprising:
an optical transmitter which transmits a frame sequence where each frame of the frame sequence has a forward error correction (FEC) coded portion wherein the FEC coded portion uses a reserved optical transport unit (OTU) byte to encode a FEC mode, the transmitter incorporates multi-mode error correction circuits that create no error correction in a first mode, a first error correction code sequence in accordance with received data in a second mode and a second error correction sequence in accordance with received data in a third mode and a pre-selected error correction mode indicator, said correction mode indicator having a first value in the first mode, a second value in the second mode and a third value in the third mode; and the optical transmitter includes data transmission elements that transmit at least the code sequence and error correction mode indicator incorporated into the OTU byte of each of the respective frames of the frame sequence.

2. An apparatus as in claim 1 which includes: a receiver responsive to a received error correction code sequence, and error correction mode, includes circuitry that corrects errors in received data in accordance therewith.

3. An apparatus as in claim 2 where the transmitter includes a plurality of substantially identical multi-mode error correction circuits and respective data transmission elements, the data transmission elements are each associated with a respective transmission wavelength.

4. An apparatus as in claim 2 where the transmitter and receiver are linked by at least one of a fiber optic transmission medium, or, a wireless electro-magnetic transmission medium.

5. An apparatus as in claim 2 where the transmitter includes framing circuitry.

6. An apparatus as in claim 5 where the framing circuitry processes incoming data to form transmission frames each having a payload data section, an error correction mode indicating section and an error correction code section.

7. An apparatus as in claim 6 where the date transmission elements of the transmitter serialize and transmit the frames to the receiver via a predetermined medium.

8. An apparatus as in claim 6 where the receiver circuitry includes framing circuitry, and error correction circuitry, responsive to a received error correction mode indicator, to process and correct received payload data.

9. An apparatus as in claim 8 where the receiver associates another error correction code with corrected received payload data.

10. An apparatus as in claim 2 where the receiver includes an error mode alarm indicator.

11. An apparatus as in claim 1 where the transmitter includes error correction mode specifying circuitry.

12. A method comprising:
multi-mode error correction circuits creating a payload including received data with no error correction in a first mode, a first error correction code sequence in accordance with received data in a second mode and a second error correction sequence in accordance with received data in a third mode in accordance with a pre-selected error correction mode indicator, said correction mode indicator having a first value in the first mode, a second value in the second mode and a third value in the third mode;

a processor providing the pre-selected error correction mode indicator; and an optical transmitter that transmits a frame sequence where each frame of the frame sequence has a forward error correction (FEC) portion wherein the FEC portion uses a reserved optical transport unit (OTU) byte to encode a FEC mode, the transmitter includes data transmission elements transmitting the payload within the respective frames of the frame sequence including at least the code sequence and error correction mode indicator of the OTU byte on a frame by frame basis.

13. The method as in claim 12 further comprising selecting an error correction mode via an input to the processor.

14. The method as in claim 12 where transmitting includes optically transmitting the sequences.

15. The method as in claim 14 where optically transmitting includes modulating an optical signal of a selected wavelength.

16. The method as in claim 15 which includes determining the error correction mode of a received sequence.

17. The method as in claim 16 which includes processing the received data sequence in accordance with the determined error correction mode.

18. The method as in claim 16 where determining precedes processing the data sequence.

19. The method as in claim 16 where determining precedes processing the error correction code sequence.

20. The method as in claim 16 which includes issuing an alert in response to determining the error correction mode.

21. The method as in claim 15 where the data and the mode sequence are transmitted prior to transmitting the error correction code sequence.

* * * * *